Figure 1:
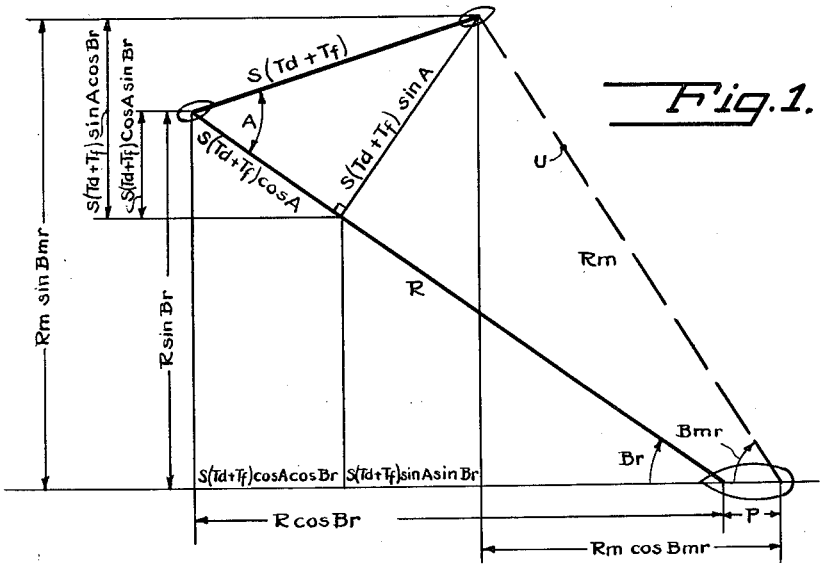

May 9, 1961

C. F. ABT ET AL 2,983,442

TARGET RANGE AND BEARING COMPUTER WITH
FIRE CONDITIONS CORRECTION APPARATUS

Filed June 29, 1953

3 Sheets-Sheet 1

INVENTORS.
CLIFFORD F. ABT
RICHARD Y. MINER
THOMAS J. CARR
ARNOLD SPITALNY

BY Raymond A. Paquin

ATTORNEY.

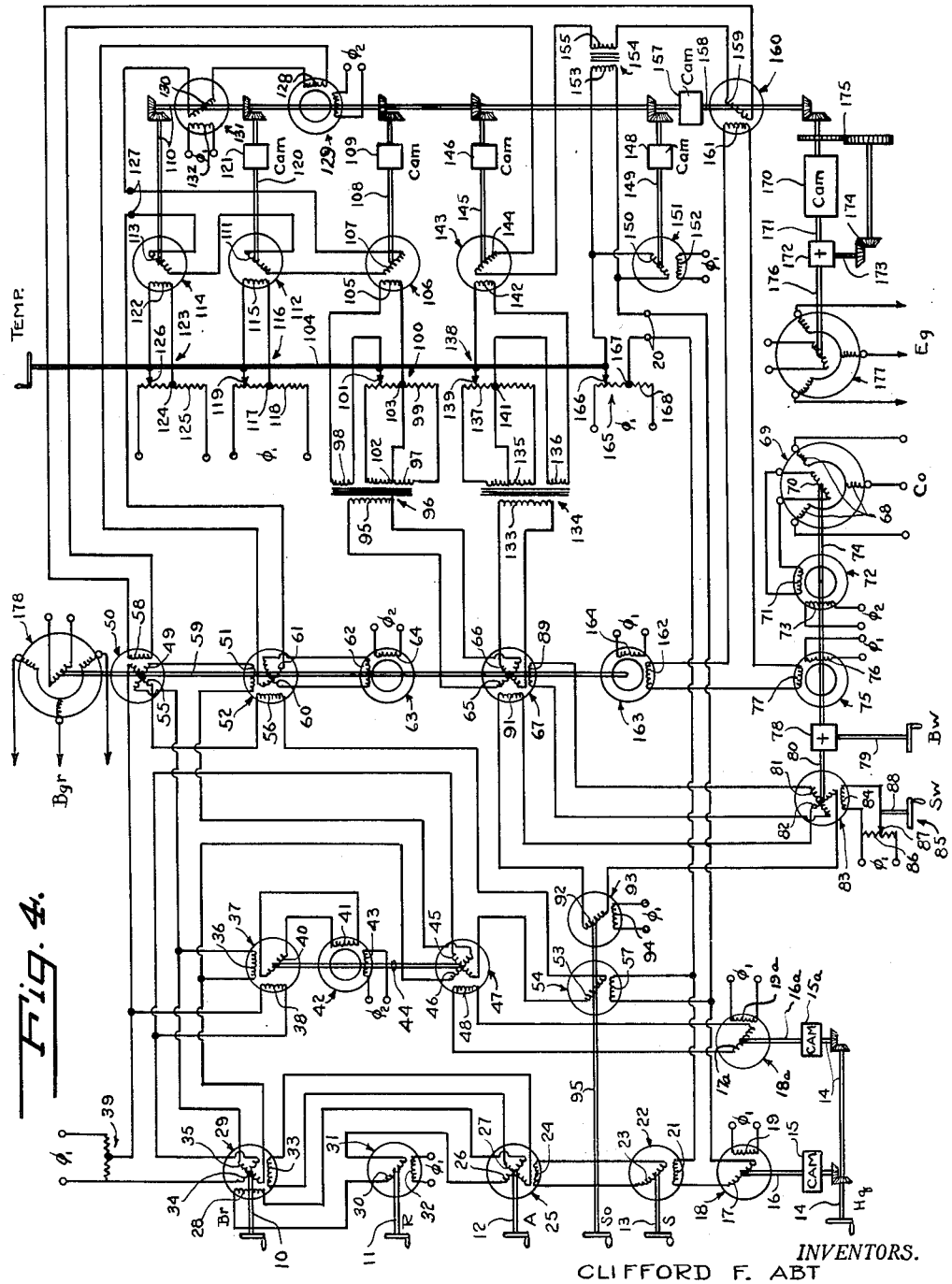

2,983,442
Patented May 9, 1961

1

2,983,442

TARGET RANGE AND BEARING COMPUTER WITH FIRE CONDITIONS CORRECTION APPARATUS

Clifford F. Abt, Long Island City, Thomas J. Carr, Brooklyn, Richard Y. Miner, Port Washington, and Arnold Spitalny, New York, N.Y., assignors to American Bosch Arma Corporation, a corporation of New York Filed June 29, 1953, Ser. No. 364,568

5 Claims. (Cl. 235—61.5)

The present invention relates to ordnance calculating apparatus and has particular reference to fire control devices for rocket propelled weapons.

The rocket propelled weapon does not behave in the same manner as explosively launched projectiles whose operation is substantially constant under widely varying conditions of operation. The rocket is particularly sensitive to changes of propellant temperature, as well as to the wind and the rate of change of the true bearing of the and the rate of change of the true bearing of the launcher, the effects of which are usually neglected in the fire control problems for ordinary weapons.

The calculating apparatus of this invention takes into consideration these peculiar operating characteristics of the weapon, the motions of the target ship and own ship and the position of the launcher in determining the required launcher bearing and elevation angles in the solution of the fire control problem.

The weapon flight characteristics are determined by comparison of the operating conditions with a set of standard conditions for which standard flight characteristics have been established by intensive tests. The variation from the standard flight characteristics for differences in the operating condition from the standard conditions has been established by tests and these variations are applied to the standard flight characteristics to obtain the actual flight characteristics. The standard flight characteristics are obtained under the standard conditions that (a) the propellant temperature is 70° F., (b) the launcher trunnion height above the water surface is 32 feet, (c) own ship speed is zero, and (d) true wind speed is zero.

The operation of the instrument is briefly as follows: The apparatus accepts information describing the motion of own ship and target ship, wind conditions, relative positions and temperature. Using a preliminary estimate of standard air range the instrument calculates the rectangular components of the missile range and bearing (in and across the direction of forward motion of the attacking ship) which are consistent with the time of flight dictated by the assumed standard air range such that a missile having the prescribed missile range, bearing and time of flight will strike the target. From these values of range and bearing and a preliminary estimate of projectile deflection consistent with the preliminary estimated standard air range, solutions for the launcher bearing and actual air range (standard air range corrected for deviations of firing conditions from standard conditions) are determined which take into account the underwater motion of the rocket and the rate of change of true launcher bearing. The solution for air range is modified by addition or subtraction of values representative of the variations in standard air range due to deviation of the firing conditions from the standard conditions. If the new value does not agree with the preliminary value, the instrument is driven to adjust the preliminary estimate until the two values of standard air range agree, which is then the solution for the required standard air range. At the same time the instrument produces a value for the launcher bearing angle. The standard air range prescribes a computed launcher elevation which is automatically corrected for the height of the launcher above sea level.

Figure 5:
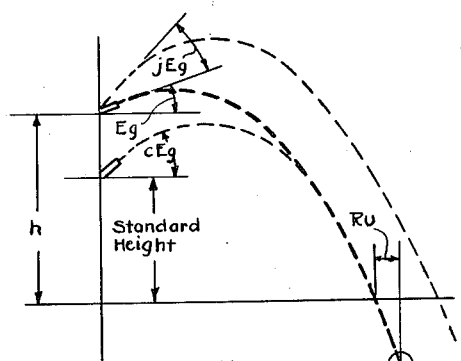
Figure 2:
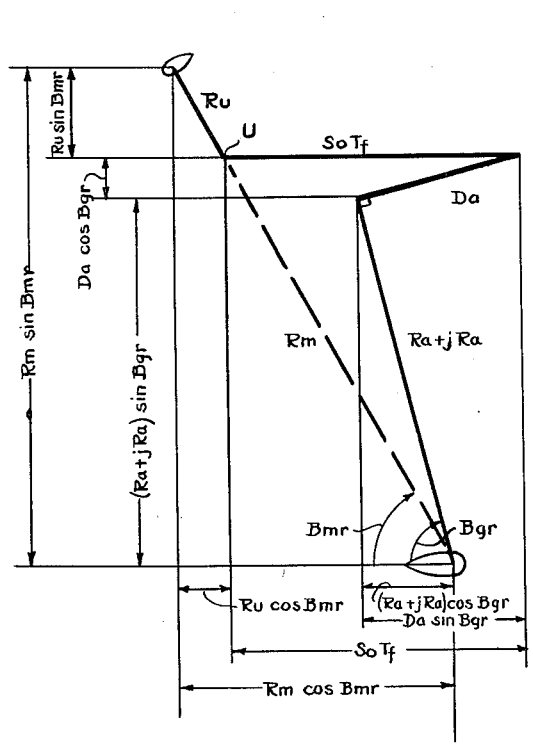
Figure 3:
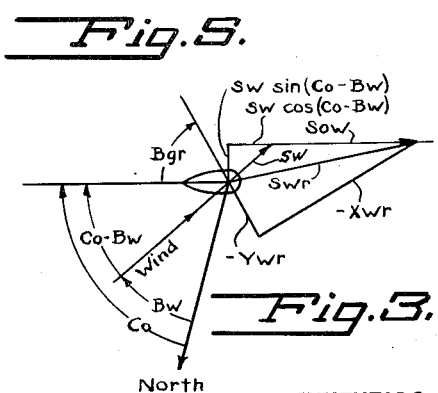
Figure 6:
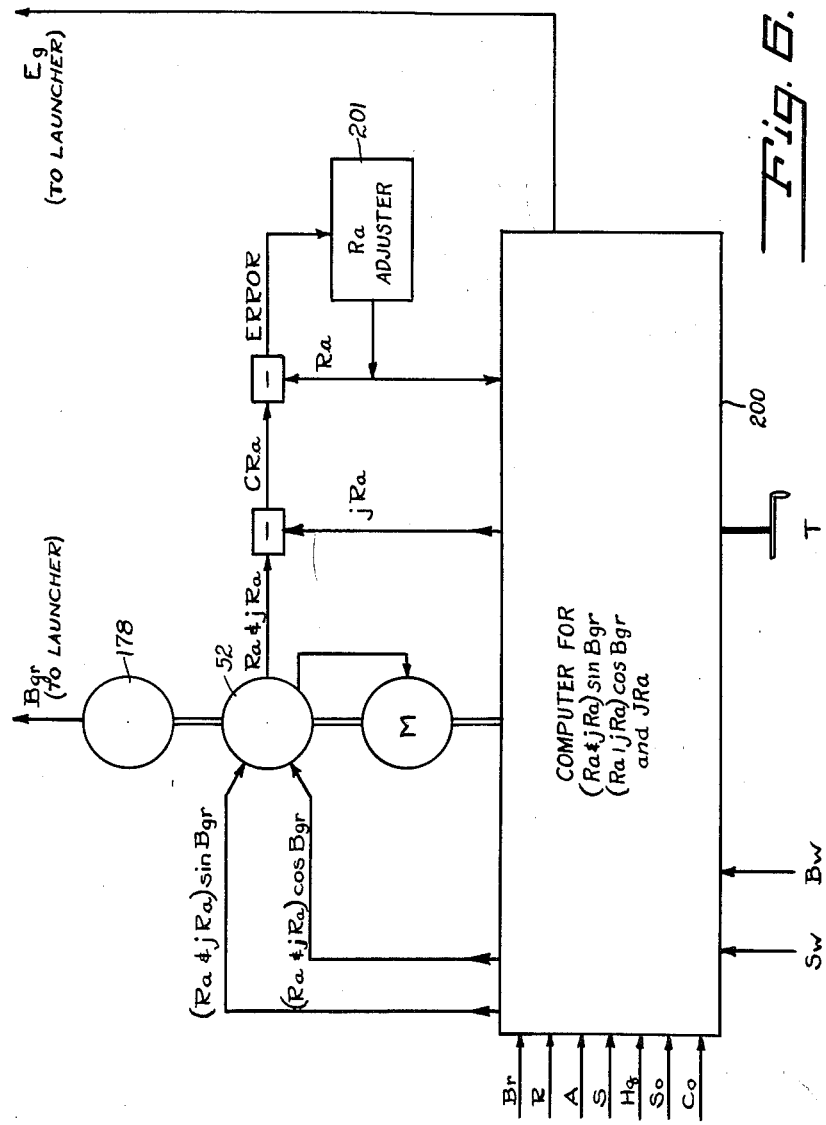

For a more complete understanding of the problem and the invention, reference may be had to the accompanying diagrams in which:

Figure 1 shows the geometry of the general problem;
Figure 2 shows the geometry of the missile travel;
Figure 3 shows the effect of wind;
Figure 4 is a schematic diagram of the computer of this invention;
Figure 5 shows the effect of height parallax;
Figure 6 is a block diagram of the schematic diagram of Fig. 4.

With reference now to Figure 1 of the drawings the basic problem and the initial step in its solution is described.

A target submarine is located at a position M, which is at a distance R and at a relative bearing Br from the observations point O on the attacking surface vessel. It is determined by observation and computing apparatus on the attacking vessel that the target is moving at a speed S along a course C and at a depth $H_q$ below the surface of the water. The computing apparatus also establishes the target angle A (between the fore and aft axis of the target and the line of sight to the target) and the curvature Q of the target track. It is assumed, for simplicity however, that the curvature Q is zero in the following description, i.e. the target is traveling on a straight path. The solution can be obtained for a curved course travel by correcting the target run in a manner similar to that used in co-pending applications Serial No. 357,263, filed May 25, 1953, and Serial No. 358,854, filed June 1, 1953, now Patent No. 2,949,824, and will not be described here.

The gun or launcher is located at a position G on the attacking vessel which is at a distance —P forward of the observation point O. (P is positive if the gun is forward of O, negative if G is aft of O.) A missile fired from G travels in air to the point of entry into the water, U, and continues to travel forward in the water while sinking at the same time. The time of flight from G to U is $T_t$ while the time of sinking to a depth $H_q$ is $T_d$. Since the missile and the target should arrive at the point M' at the same time, for effective use of the weapon, the equations relating the required missile range Rm and the missile relative bearing Bmr to known quantities can be set up as follows:

$Rm \cos Bmr = R \cos Br - P - S(T_t + T_d)$
$\qquad \cos A \cos Br - S(T_t + T_d) \sin A \sin Br$ (1)
$Rm \sin Bmr = R \sin Br + S(T_t + T_d)$
$\qquad \sin A \cos Br - S(T_t + T_d) \cos A \sin Br$ (2)

which reduce to the equations $Rm \cos Bmr = (R - S(T_t + T_d) \cos A)$
$\qquad \cos Br - S(T_t + T_d) \sin A \sin Br - P$ (1a)
$Rm \sin Bmr = (R - S(T_t + T_d) \cos A)$
$\qquad \sin Br + S(T_t + T_d) \sin A \cos Br$ (2a)

Referring now to Figure 2 it is seen that the missile range Rm, is composed of several components which are: $Ra + jRa$, the corrected standard air range of the projectile in the line of the gun or launcher, which has a relative bearing Bgr; Da, the deflection across the line of the gun or launcher; $SoT_t$, the component in the direction of the travel of own ship due to the motion of own ship; and Ru the forward travel under water which is a function of the depth under water and is in the direction of Bmr.

The unknown independent quantities in this system are the air range $Ra+jRa$, and the relative launcher bearing $Bgr$, for which the following equations can be set up from Fig. 2:

$(Ra+jRa) \cos Bgr = Rm \cos Bmr - Ru$
$\cos Bmr - SoT_t + Da \sin Bgr$ (3)
$(Ra+jRa) \sin Bgr = Rm \sin Bmr - Ru$
$\sin Bmr - Da \cos Bgr$ (4)

The $Ra+jRa$ solution found from Equations 3 and 4 establishes the required standard air range $Ra$ of the missile. The standard air range establishes a computed elevation angle, $cEg$, for a launcher at the standard height above the water as dictated by the standard flight characteristics. The actual elevation of the launcher, $Eg$, is derived by applying a correction $jEg$ to the computed elevation which accounts for the height parallax. Thus, $$Eg = cEg + jEg \quad (5)$$

where $jEg$ is a function of the launcher height above the water and of the computed elevation $cEg$, and is determined from the tests made during establishment of the standard flight characteristics.

Figure 5 shows the effect of height parallax and the application of the correction $jEg$ therefor. A projectile fired from the standard height at an elevation angle of $cEg$ has a missile range $Rm$, while a projectile fired from a height $h$ at an elevation $cEg$ will have a range other than $Rm$. Therefore, a correction angle $jEg$ is applied to $cEg$ to produce a corrected elevation angle $Eg$ such that the projectile fired at this elevation angle from the height $h$ will have a range equal to $Rm$.

The air range of the projectile is equal to $Ra+jRa$ where $Ra$ is the standard air range of the projectile, i.e. under standard conditions, and $jRa$ is a correction which accounts for changes in the standard air range due to variations of propellant temperature from the standard and for the effect of the wind. The $jRa$ correction is actually a summation of three separately applicable corrections: $jRa21$ which is a function of the propellant temperature and a standard air range, $jjRa21$ which is a correction to $jRa21$ and is also a function of the propellant temperature and standard air range, and $jRa321$ which is a function of wind velocity, propellant temperature and standard air range.

The value of $jRa21$ is proportional to the product of $jRa1$ and $jRa2$ where $jRa1$ is a function of standard air range and $jRa2$ is a function of propellant temperature.

The value of $jjRa21$ is proportional to the product of $(jjRa2)$ and $Ra$, where $jjRa2$ is a different function of the propellant temperature and $Ra$ is the standard air range.

The value of $jRa321$ is proportional to the product: $(jRa1w)$ $(K(Ywr)+(Ywr)jjRa2w)$ where $jRa1w$ is a function of standard air range, $Ywr$ is the component of apparent wind velocity along the line of fire, $jjRa2w$ is a function of the propellant temperature and K is a constant.

The above values have been established by exhaustive operational tests and are to be accepted as appropriate without further demonstration.

During the flight in air, the projectile also drifts across the line of fire. This drift, $Da$, is composed of three components: $D_t$, due to a natural tendency of the rocket to drift to the left; $Da321$, a component due to wind velocity which is also a function of propellant temperature and standard air range; and $D4$, the component which is a function of the rate of true bearing of the launcher.

The value of $D_t$ is equal to $(K1)(T_t1)$ where $T_t1$ is the time of flight and is a function of standard air range, $Ra$, and $K1$ is a constant.

The value of $Da321$ is proportional to the product $(Da1w)$ $(K2Xwr+(jDa2)Xwr)$ where $Xwr$ is the apparent cross wind velocity, $jDa2$ is a function of the propellant temperature, $Da1w$ is a function of standard air range and $K2$ is a constant.

The value of $Da4$ is proportional to the rate of change of true launcher bearing and is also a function of the computed elevation angle of the launcher. Thus $$Da4 = K3\frac{dBg}{dt} \sin K4cEg$$

where K3 and K4 are constants, $$\frac{dBg}{dt}$$

is the true launcher bearing rate and $cEg$ is the computed launcher elevation for a launcher at standard height above water.

Figure 3 illustrates the calculation of the $Xwr$ and $Ywr$ components of wind velocity used in the determination of $jRa$ and $Da$ as previously described. The wind is blowing from a bearing $Bw$ (measured from the north) with a velocity $Sw$, and the attacking ship is moving on a course $Co$ with a speed $So$. The apparent wind velocity $Sow$ due to own ship speed is directed opposite to the direction of own ship travel but is of the same magnitude as $So$. Thus, $Sow = -So$. The $Sw$ and $Sow$ velocities are added vectorially to produce the vector sum $Swr$ which is then resolved into the components $Xwr$ and $Ywr$ across and along the launcher, which is set at a relative bearing $Bgr$. By definition, $Ywr$ is positive when it is a tail wind, and $Xwr$ is positive when coming from the right. Thus, in Fig. 3, both $Xwr$ and $Ywr$ negative, and, $-Xwr = (Sw \cos (Co-Bw)+So)$
$\sin Bgr + Sw \sin (Co-Bw) \cos Bgr$ (6)
$-Ywr = (Sw \cos (Co-Bw)+So)$
$\cos Bgr - Sw \sin (Co-Bw) \sin Bgr$ (7)

The solution to the problem is accomplished in the electromechanical computing apparatus of this invention, the wiring diagram of which is shown schematically in Fig. 4 and as a block diagram in Fig. 6.

Briefly, the system functions as follows: The computing section 200 determines the components $(Ra+jRa) \sin Bgr$ and $(Ra+jRa) \cos Bgr$ from inputs of own ship motion, target motion and position, wind characteristics, temperature and a tentative $Ra$ value. The components are combined in the set-up resolver 52 to produce values of $Ra+jRa$ and $Bgr$. The computer section 200 also determines a value of $jRa$ correction required for the given temperature and tentative air range $Ra$. The $Ra+jRa$ value from resolver 52 and the $jRa$ value from the computer 200 are combined to give a calculated air range, $cRa$. The tentative air range is compared with the calculated air range and adjusted at 201 until the two are equal. The $Ra$ output of 201 is equal to the air range after solution is completed. The $Ra$ value determines the launcher elevation, $Eg$, which is also computed in the computer 200. The $Bgr$ value at resolver 52 determines the launcher bearing and is transmitted thereto by transmitter 178.

The successful operation of electromechanical circuits such as that of Figure 4 requires use of additional components, such as amplifiers, damping devices, phase shifters and scaling elements for example, which have been omitted from Fig. 4 in the interest of simplicity. Also, the values of the variable quantities such as $Br$, $R$, $A$, $S$, $Hq$ are preferably introduced by servo controlled means which continuously and automatically position their respective shafts, but for simplicity the shafts are shown as being manually adjusted to these values.

The expression "proportional to" as applied to a voltage should be taken to indicate that the amplitude of the voltage is proportional to the magnitude of the quantity and that the phase of the voltage changes by 180° upon reversal of sign of the quantity. A similar interpretation should be given to a shaft displacement which is described as "proportional to" a quantity.

The instrument is supplied with a constant two phase alternating voltage, the two phases of which are represented by the symbols $\phi_1$ and $\phi_2$. The signal voltages are derived from $\phi_1$, while $\phi_2$ is used to energize the main field windings of the two-phase induction motors.

With reference now to Figure 4, shafts 10, 11 12, 13, 14 are positioned according to the values of Br, R, A, S and Hq as determined by the observing and computing apparatus previously referred to. The displacement of shaft 14 is modified by the cam 15 to displace the shaft 16 according to Td, the sinking time of the projectile, which is a function of the depth Hq. Shaft 16 drives, the rotor winding 17 of induction potentiometer 18, the stator winding 19 of which is energized by $\phi_1$, so that the output voltage of rotor winding 17 is proportional to Td.

The rotor winding 17 is connected in series with terminals 20 and with stator winding 21 of induction potentiometer 22 so that the voltage energizing the stator winding 21 is the algebraic sum of the voltage of rotor winding 17 and terminals 20. Designating the voltage at terminals 20 as proportional to $T_t$ (which corresponds to the solution for Ra at shaft 110) the voltage energizing stator winding 21 is proportional to $(Td+T_t)$. Rotor winding 23 of potentiometer 22 is displaced by shaft 13 according to S, so that the output of rotor winding 23 is proportional to $S(Td+T_t)$. The rotor winding 23 is connected to energize the stator winding 24 of resolver 25, the rotor windings 26 and 27 of which are driven according to A by the shaft 12. The output voltage of rotor windings 26 and 27 are therefore proportional to $S(Td+T_t)\cos A$ and $S(Td+T_t) \sin A$ respectively. Rotor winding 26 energizes the primary or stator winding 28 of resolver 29 jointly with the output of secondary winding 30 of potentiometer 31. The secondary winding 30 is driven by shaft 11 according to R while the primary winding 32 is energized by $\phi_1$, so that the output of secondary winding 30 is proportional to R, and the voltage energizing the primary winding 28 of resolver 29 is proportional to $R-S(Td+T_t) \cos A$. Secondary winding 27 of resolver 25 is connected to energize the primary winding 33 of resolver 29 directly. The secondary windings 34 and 35 of resolver 29 are driven by shaft 10 according to the relative target bearing, Br, whence the voltages induced in secondary windings 34 and 35 are respectively proportional to:

$(R-S(Td+T_t) \cos A) \cos Br - S(Td+T_t) \sin A \sin Br$ and $(R-S(Td+T_t) \cos A) \sin Br + S(Td+T_t) \sin A \cos Br$.

Secondary winding 35 energizes the primary winding 36 of resolver 37 directly, whence the voltage energizing primary winding 36 is proportional to $Rm \sin Bmr$ as seen by referring to Equation 2a.

Primary winding 38 of resolver 37 is energized by secondary winding 34 jointly with the output of voltage divider 39 which is proportional to the baseline distance P, and is added algebraically to the voltage of secondary winding 34. Thus the voltage energizing the primary winding 38 is proportional to:

$(R-S(Td+T_t) \cos A) \cos Br$
$\qquad -S(Td+T_t) \sin A \sin Br - P$ or to $Rm \cos Bmr$ as seen by referring to Equation 1a. Secondary winding 40 of resolver 37 is connected to energize the control field winding 41 of the two phase induction motor 42, the main field winding 43 of which is energized by $\phi_2$ of the voltage supply. Motor 42 drives the shaft 44 and thereby drives the secondary winding 40 to the null position so that motor 42 is deenergized. The displacement of shaft 44 from its zero position is the solution for the angle Bmr of Equations 1a and 2a since the voltage energizing the primary windings 38 and 36 are respectively proportional to $Rm \cos Bmr$ and $Rm \sin Bmr$.

Shaft 44 also drives the secondary windings 45 and 46 of resolver 47, the primary winding 48 of which is energized by the output of secondary winding 17a of induction potentiometer 18a. The primary winding 19a of potentiometer 18a is energized by $\phi_1$ and the secondary winding 17a is driven by shaft 16a which is the output shaft of cam 15a, the input shaft of cam 15a being shaft 14 which is displaced proportionally to Hq. Shaft 16a is therefore displaced according to Ru, the forward underwater travel of the projectile, as determined by the value of Hq, so that the voltage output of rotor winding 17a and the voltage energizing primary winding 48 is proportional to Ru.

The output voltages of secondary windings 45 and 46 are therefore proportional respectively to $Ru \cos Bmr$ and $Ru \sin Bmr$. Secondary winding 46 is connected in series with secondary winding 35, secondary winding 49 of resolver 50 and with primary winding 51 of resolver 52 so that the voltage energizing the primary winding 51 is the algebraic difference between the output of rotor winding 35 and the sum of the outputs of rotor windings 46 and 49.

Secondary winding 45 is connected in series with secondary winding 53 of induction potentiometer 54, secondary winding 34, voltage divider 39, secondary winding 55 of resolver 50 and primary winding 56 of resolver 52 so that the voltage energizing the primary winding 56 is the algebraic difference between the sum of the outputs of secondary windings 34, 55 and voltage divider 39 and the sum of the outputs of secondary windings 45 and 53.

The primary winding 57 of potentiometer 54 is energized by the $T_t$ voltage of terminals 20, while the secondary winding 53 is displaced according to So, the speed of the attacking ship, by the shaft 95. Shaft 95 is preferably servo-controlled by means responsive to So although the illustration in Figure 4 shows manual means for displacement. The voltage output of the rotor winding 53 is therefore proportional to the product $SoT_t$.

Assume for the present that the voltage energizing the primary winding 58 of resolver 50 is proportional to Da, the drift of the missile in air, and that the displacement of shaft 59 which drives the windings 49 and 55 of resolver 50 and rotor windings 60 and 61 of resolver 52 is cBgr. Then the voltage output of secondary winding 55 is proportional to $Da \sin cBgr$ and the voltage output of secondary winding 49 is proportional to $Da \cos cBgr$.

It will be seen that the voltage energizing the stator winding 51 of resolver 52 is proportional to the following:

$(R-S(Td+T_t) \cos A) \sin Br + S(T_t+Td) \sin A \cos Br$
$\qquad -Ru \sin Bmr - Da \cos cBgr$ which is the same as $(Ra+jRa) \sin Bgr$ as shown by Equations 2a and 4, when $cBgr=Bgr$. It will also be seen that the voltage energizing the primary winding 56 of resolver 52 is proportional to the following:

$(R-S(Td+T_t) \cos A) \cos Br - S(Td+T_t) \sin A \sin Br$
$\qquad -Ru \cos Bmr + Da \sin cBgr - SoT_t - P$ which is the same as $(Ra+jRa) \cos Bgr$ as seen by comparison with Equations 1a and 3, when $cBgr=Bgr$.

The secondary winding 60 of resolver 52 is connected to the control field winding 62 of two phase induction motor 63, the main field winding 64 of which is energized by $\phi_2$. Under the assumed condition that the displacement of shaft 59, which is driven by motor 63, is proportional to Bgr the voltages induced in secondary winding 60 by the primary windings 51 and 56 cancel one another and the secondary winding 60 is the null position so that motor 63 is deenergized. If the displacement of shaft 59 does not correspond to the angle dictated by the voltages energizing primary windings 51 and 56, the motor 63 is energized to drive the secondary winding 60 to the null or solution position. In the solution position the voltage induced in the secondary winding 61 is proportional to $Ra+jRa$. A voltage proportional to $jRa$ is subtracted from the $Ra+jRa$ voltage to produce a voltage proportional to $Ra$ which is used to control the position of the $Ra$ shaft 110 in the manner to be described.

Shaft 59 drives the rotor windings 65 and 66 of resolver 67, the output voltages of which are proportional to $Ywr$ and $Xwr$, the wind velocities in and across the line of the gun, respectively as will be shown.

The stator windings 68 of a self synchronous control transformer 69 are energized by position signals corresponding to $Co$, the course of the attacking ship, which are produced by a self synchronous transmitter (not shown) located at the ship's compass. The rotor winding 70 of the control transformer 69 is connected to the control field winding 71 of two phase induction motor 72, the main field winding 73 of which is energized by $\phi_2$. Motor 72 is mechanically connected to drive rotor winding 70 and therefore tends to deenergize itself by driving the rotor winding 70 towards the null position so that the position of shaft 74 corresponds to $Co$ when motor 72 is deenergized. Motor 72 also drives the rotor of induction generator 75, the main field winding 76 of which is energized by $\phi_1$, at a speed approximately proportional to the rate of change of course as motor 72 tends to retain its deenergized condition, so that the voltage induced in the output winding 77 of generator 75 is proportional to the rate of change of course $$\frac{dCo}{dt}$$

Shaft 74 is one input to the mechanical differential 78, the other input shaft 79 of which is displaced according to $Bw$, the true bearing of the direction from which the wind is blowing. The angle $Bw$ is determined by apparatus (not shown) and is preferably driven by means controlled by such apparatus although Fig. 4 shows manual means for displacing shaft 79. The displacement of the output shaft 80 of differential 78 is the algebraic difference between the displacement of the input shafts 74 and 79 or is proportional to $Co-Bw$. Shaft 80 drives the secondary windings 81 and 82 of resolver 83, the primary winding 84 of which is energized by the voltage output of potentiometer 85.

The resistance winding 86 of potentiometer 85 is energized by $\phi_1$ while the movable contact 87 is displaced by shaft 88 according to $Sw$, the wind velocity. The value of $Sw$, is determined by apparatus not shown, which preferably is used to effect automatic positioning of shaft 88, although manual means as shown in Fig. 4 may be used to displace shaft 88 if desired. The output of potentiometer 85 taken between one end of resistance 86 and the movable contact 87 is therefore proportional to $Sw$.

Since the energizing voltage of primary winding 84 is proportional to $Sw$, and the secondary windings 81 and 82 are displaced according to $Co-Bw$, the voltages induced in secondary windings 81 and 82 are proportional respectively to: $Sw \sin(Co-Bw)$ and $Sw \cos(Co-Bw)$.

Secondary winding 81 energizes the primary winding 89 of resolver 67 directly, while primary winding 91 of resolver 67 is energized jointly by the outputs of secondary windings 82 and secondary winding 92 of the potentiometer 93.

The primary winding 94 of potentiometer 93 is energized by $\phi_1$ and the secondary winding 92 is displaced relatively thereto by the shaft 95 according to $So$, whence the voltage output of secondary winding 92 is proportional to $So$ and the voltage energizing the winding 91 is proportional to $Sw \cos(Co-Bw)+So$. Since the primary windings 89 and 91 of resolver 67 are energized proportionally to $$Sw \sin(Co-Bw) \text{ and } Sw \cos(Co-Bw)+So$$

and the rotor windings 65 and 66 are displaced according to the angle $Bgr$ by shaft 59, the output voltages of rotor windings 65 and 66 are respectively proportional to:

$(Sw \cos(Co-Bw)+So) \sin Bgr$
$\quad +Sw \sin(Co-Bw) \cos Bgr$ and $(Sw \cos(Co-Bw+So) \cos Bgr$
$\quad -Sw \sin(Co-Bw) \sin Bgr$ which are respectively proportional to $Ywr$ and $Xwr$ as will be seen by comparison with Equations 6 and 7.

The $Ywr$ output of rotor winding 65 energizes the primary winding 95 of transformer 96, which has two secondary windings 97 and 98. One secondary winding 97 energizes the resistance winding 99 of potentiometer 100, the movable contact 101 of which is displaced according to the propellant temperature. Tap 102 of secondary winding 97 is connected to a tap 103 on the resistance winding 99. Movable contact 101 is displaced manually from the tap 103 upon variation of the propellant temperature from the standard temperature by shaft 104 to produce a voltage between contact 101 and tap 103 which is proportional to $Ywr(jjRa2w)$ where $(jjRa2w)$ is a function of the propellant temperature. The $Ywr(jjRa2w)$ voltage is dependent upon proper choice of the combination of non-linearity of potentiometer resistance 99 and the non-linear relation between the variation of temperature and the displacement of shaft 104.

The ratio of transformation between the windings 95 and 98 of transformer 96 is such that the output of secondary winding 98 is proportional to $K(Ywr)$. Secondary winding 98 is connected in series with the output of potentiometer 100 and the primary winding 105 of induction potentiometer 106 so that the voltage energizing the primary winding 105 is proportional to $K(Ywr)+Ywr(jjRa2w)$. The secondary winding 107 of potentiometer 106 is driven by the shaft 108 which is the output of the cam assembly 109, the input of which is driven by the shaft 110. The relationship between the displacement of shafts 108 and 110 is according to the function $jRa1w$, a function of the standard air range. Assuming as before that the displacement of shaft 110 is $Ra$ (the solution of standard air range) then the displacement of shaft 108 is proportional to $jRa1w$ and the output of rotor winding 107 is proportional to $(jRa1w)[K(Ywr)+Ywr(jjRa2w)]$ which is proportional to $jRa321$ as defined earlier.

The secondary winding 107 is connected in series with the secondary winding 111 of potentiometer 112 and secondary winding 113 of potentiometer 114 to produce a voltage proportional to $jRa$ in the manner to be described.

The primary winding 115 of potentiometer 112 is energized by the output of resistance potentiometer 116 taken between the tap 117 on resistance winding 118 and the movable contact 119 which is displaced from tap 119 by the shaft 104. The resistance 118 is tapered in a manner such that the displacement of contact 119 according to the temperature of the propellant by shaft 104 results in an output voltage proportional to $jRa2$. The secondary winding 111 of potentiometer 112 is driven by shaft 120 by the cam assembly 121 which is actuated by shaft 110. The relationship between the displacement of shaft 121 and shaft 110 is according to the function $jRa1$. The output of rotor winding 111 is therefore proportional to the product of $jRa1$ and $jRa2$, or to the value of $jRa21$ described earlier.

The primary winding 122 of potentiometer 114 is energized by the output of resistance potentiometer 123, taken between the tap 124 on resistance winding 125, and the movable contact 126 which is displaced from the tap 124 by shaft 104 according to the propellant temperature. The resistance winding 125 is energized by the constant voltage of $\phi_1$ and the combination of taper of resistance winding 125 and the relationship between displacement of contact 126 with the variation of temperature are jointly effective to produce a voltage output proportional to $jjRa2$. The rotor winding 113 of potentiometer 114 is geared directly to shaft 110 so that the output voltage of secondary winding 113 is proportional to the product of ($jjRa2$) and $Ra$, which is proportional to $jjRa21$ as defined earlier.

Thus it will be seen that the voltage at terminals 127 which is the sum of the outputs of rotor windings 107, 111, and 113 is proportional to $jRa21+jjRa21+jRa321$ which is the same as $jRa$ as defined earlier.

Terminals 127 are connected in series with secondary winding 61 of resolver 52 to produce a voltage proportional to $Ra+jRa-jRa=Ra$ which is utilized to position the shaft 110 accordingly, in the usual manner. The control field winding 128 of motor 129 is energized by the difference between the $Ra$ signal voltage and the output of the rotor winding 130 of induction potentiometer 131. The primary winding 132 of potentiometer 131 is energized by $\phi_1$ and the rotor winding 130 is driven by motor 129 by means of shaft 110, so that motor 129 drives shaft 110 until the output of rotor winding 130 is equal and opposite to the $Ra$ signal voltage (from rotor winding 61 and terminals 127) and motor 129 is deenergized. The rotation of shaft 110 does not merely vary the voltage of rotor winding 130, but simultaneously affects the $Ra$ solutions by adjusting the $jRa$ value as described, and by adjusting the $T_t1$ and the $Da$ values as will be described.

Rotor winding 66 of resolver 67 is connected to the primary winding 133 of transformer 134 to energize the primary winding 133 with a voltage proportional to $Xwr$. Voltages proportional to $Xwr$ and $K2$ ($Xwr$) are produced in the secondary windings 135 and 136 respectively of the transformer 134. Secondary winding 135 energizes the resistance winding 137 of potentiometer 138, the movable contact 139 of which is adjusted by shaft 104 according to the temperature of the propellant. The output of potentiometer 138, taken between movable contact 130 and tap 141 on resistance 137, which is also connected to tap 141 on secondary winding 135, is proportional to $Xwr$ ($jDa2$), where the taper of resistance 137 is chosen to combine with the adjustment of contact 139 to produce a ratio of $jRa2$ between the input and output voltages of the potentiometer 138.

The $K2$ ($Xwr$) voltage of secondary winding 136 is added to the $Xwr(jDa2)$ output of potentiometer 138 by connecting the secondary winding 136 in series with the output of potentiometer 138 and the total voltage $$(Xwr(jDa2)+K2Xwr)$$

is applied to the primary winding 142 of potentiometer 143 to energize said winding.

The secondary winding 144 of potentiometer 143 is displaced relatively to the primary winding 142 by the output shaft 145 of cam assembly 146, the input of which is actuated by the shaft 110.

Cam 146 is of such construction that the ratio of displacement of shaft 145 with respect to the displacement of shaft 110 is according to the function $Da1w/Ra$, whence the displacement of shaft 145 corresponds to $Da1w$. The voltage induced in secondary winding 144 is proportional to the product of the primary excitation and the secondary winding displacement and is therefore proportional to $(Da1w)(Xwr(jDa2)+Kxwr)$ which is proportional to $Da321$, as defined earlier.

Shaft 110 is also the input shaft of cam assembly 148, the output shaft 149 of which drives the secondary winding 150 of the induction potentiometer 151, the primary winding 152 of which is energized by $\phi_1$. The cam assembly 148 is such that the displacement of shaft 149 is proportional to $T_t1$ the component of the time of flight in air which is a function of the standard air range, so that the output voltage of secondary winding 150 is proportional to $T_t1$. Secondary winding 150 is connected to energize the primary winding 153 of scaling transformer 154, to produce a voltage proportional to $(K1)(T_t1)$ or $Df$ in the secondary winding 155.

Shaft 110 is also the input shaft of cam assembly 157 the output shaft 158 of which is displaced according to $K3cEg$, which is a function of $Ra$, and is connected to displace the secondary winding 159 of induction resolver 160. The primary winding 161 of resolver 160 is energized jointly by the outputs of the output winding 77 of generator 75 and the output winding 162 of generator 163. The rotor of generator 163 is driven by shaft 59, while the main field winding 164 is energized by $\phi_1$ so that the voltage induced in output winding 162 is proportional to $$\frac{dBgr}{dt}$$

the rate of change of the calculated relative launcher bearing. The output voltage of output winding 77 has been previously shown to be proportional to $$\frac{dCo}{dt}$$

the rate of change of own ships course. Thus the voltage energizing the primary winding 161, i.e. the sum of the outputs of windings 77 and 162, is proportional to $$\frac{dCo}{dt} - \frac{dBgr}{dt} = \frac{dBg}{dt}$$

the rate of change of true launcher bearing.

Since the displacement of shaft 158 is proportional to $K3c\ Eg$ and the excitation voltage of primary winding 161 is proportional to $$\frac{dBg}{dt}$$

a voltage proportional to $$\frac{dBg}{dt} \sin K3cEg$$

is produced in secondary winding 159. It has been shown earlier that $$\frac{dBg}{dt} \sin K3cEg$$

is proportional to $Da4$, whence the output of secondary winding 159 is proportional to $Da4$.

The secondary windings 159, 155 and 144 are connected in series with one another and with the primary winding 58 of resolver 50. The voltage energizing the primary winding 58 is the sum of the voltage of windings 159, 155 and 144 or a voltage proportional to $$Da4+Df+Da321$$

which is proportional to $Da$, the drift of the missile in air, as assumed earlier in the description of the operation of the instrument.

The voltage at terminals 20, previously assumed to be proportional to $T_t$ is the sum of the voltage output of secondary winding 150 of potentiometer 151 and the output of potentiometer 165 which is taken between movable contact 166 and tap 167 on resistance winding 168. The winding 168 is energized by the constant voltage of $\phi_1$ and the movable contact 166 is displaced by shaft 104 from the tap 167 according to the difference in temperature of the propellant from the standard temperature. Thus, the output of potentiometer 168 is a function of the variation of the temperature of the propellant from the standard which is proportional to $T_t2$ the component of the time of the flight of the projectile due to a deviation of the temperature of propellant from the standard. The voltage at terminals 20 is therefore proportional to $T_t1+T_t2$ or to $T_t$, the time of flight of the projectile as assumed earlier in the description.

A review of the operation of the circuit at this time is advisable. The invention performs to produce a solution of $Ra$ at shaft 110 and $Bgr$ at shaft 59 in accordance with the Equations 3 and 4 from input quantities of $Br$, $R$, $A$, $S$, $Hq$, $So$, $Co$, $Bw$, $Sw$, and propellant temperature.

In the initial stages of solution there is at terminals 20 a voltage representative of $T_t$ which is determined by the particular value of $Ra$ at shaft 110. The $Ra$ value at this time is a tentative value which may have been initially entered by hand, or it may be the value representing the solution of a previous problem.

With certain of the input values and $T_t$, voltages proportional to $Rm \cos Bmr$ and $Rm \sin Bmr$ are synthesized and a solution for $Bmr$ is obtained at shaft 44.

The $Ra$ solution presented by shaft 110 also determines the values of the $Da$ voltage applied to primary winding 58 and the $jRa$ correction voltage at terminals 127.

The $Da$ value is combined with the values for $$Rm \cos Bmr, Rm \sin Bmr, Ru \sin Bmr$$

$Ru \cos Bmr$ and $SoT_t$ to produce a value of $Bgr$ at shaft 59. The resulting solution for $Ra+jRa$ from the $Bgr$ setup resolver 52 is modified by subtraction of $jRa$ and the resulting value of $Ra$ is compared with the initial solution for $Ra$ at shaft 110. If the position of shaft 110 does not agree with the solution for $Ra$ as determined from the $Ra+jRa$ value from resolver 52, the motor 129 adjusts the position of shaft 110 toward a better solution of $Ra$. The shaft solution for $Ra$ is continuously compared with the voltage solution for $Ra$ as determined by the solution for $Ra+jRa$ at resolver 52 and shaft 110 is driven to a position where the two solutions agree. In this condition the Equations 3 and 4 are solved, and the displacement of shaft 110 is proportional to $Ra$, while displacement of shaft 59 corresponds to $Bgr$.

The value of $Ra$ at shaft 110 establishes a Computed Launcher Elevation $cEg$ which is the elevation required at the standard launcher height to attain a range of $Ra$ for the projectile. The correction $jEg$, which corrects for the launcher being at other than standard height, is related to $cEg$ in a known manner and is applied to $cEg$ to obtain the value of the Vertical Launcher Elevation $Eg$.

In Figure 4 this is effected in the following manner: Shaft 158, displaced according to $cEg$ as previously described, drives the input of cam 170 which is constructed to drive the output shaft 171 according to the ratio of $jEg/cEg$ for the known height of the launcher. The displacement of the output shaft 171 which is also one input to differential 172 therefore is proportional to $jEg$. The other input shaft 173 of the differential 172 is driven by shaft 158 according to $cEg$ by means of the gearing 174, 175. The displacement of the output shaft 176 of differential 172 is the algebraic difference between the displacement of shafts 173 and 171 or is proportional to $(cEg-jEg)$ which is the required Vertical Elevation, $Eg$. In operation, shaft 158 is preferably driven by a servo motor which is responsive to the output of cam 157 since the load imposed on cam 157 by the cam 170, differential 172 and the associated gearing may be too great for direct drive by cam 157.

The calculated values of $Eg$ and $Bgr$ are transmitted to the launcher by means of self synchronous transmitters 177 and 178 respectively which provide control signals to the motors (not shown) used to position the launcher in elevation and azimuth. The values of $Eg$ and $Bgr$ may be modified in "gimbal solving" apparatus whereby the solutions for $Eg$ and $Bgr$ are made measurable with respect to the deck of the vessel instead of the horizontal plane if required.

We claim:
1. In an ordnance calculating apparatus for missile launchers, means for calculating the required range and bearing of a missile according to a tentative value of standard air range and according to motion of own ship and target ship and range and relative bearing of the target ship, means for determining the rectangular components of the air range which is needed to achieve said required missile range, resolver means for composing said components into a calculated air range and launcher bearing angle, means for computing the variation in air range due to deviations in firing conditions from standard conditions for said tentative air range and for modifying said calculated air range according to said variations in tentative air range due to said deviation of firing conditions, means for comparing said modified calculated air range with said tentative value from standard conditions and means for comparing and correcting said preliminary estimate until it agrees with said modified calculated air range.

2. In an ordnance calculating apparatus for missile launchers, means for calculating the required range and bearing of a missile according to a tentative value of standard air range and according to motion of own ship and target ship and range and relative bearing of the target ship, means for determining the rectangular components of the air range which is needed to achieve said required missile range, resolver means for composing said components into a calculated air range and launcher bearing angle, means for computing the variation in air range due to deviations in firing conditions from standard conditions for said tentative air range and for modifying said calculated air range according to said variations in tentative air range due to said deviation of firing conditions, means for comparing said modified calculated air range with said tentative value from standard conditions and means for comparing and correcting said preliminary estimate until it agrees with said modified calculated air range, and computing means controlled by said apparatus for establishing the elevation of the launcher and means for correcting the calculated elevation of the gun according to any deviation from standard in the height of the launcher platform from the water line.

3. In an ordnance calculating apparatus, electro-mechanical apparatus including a first shaft adapted to be rotated to a setting according to an estimated range, a first potentiometer operatively connected to said shaft and controlled by the displacement of said first shaft, a second potentiometer producing a voltage depending on the depth of the target, electrical means including third and fourth potentiometers and a pair of electrically connected resolvers, a first one of said resolvers being connected to said third potentiometer, the second of said resolvers being connected to the said fourth potentiometer and to said first resolver, said third potentiometer being energized by the total output of said first and second potentiometers, a third resolver connected to and energized by the outputs of said second resolver, the shaft of said third resolver being positioned according to said outputs of said second resolver, a fourth resolver whose rotor is positioned by said shaft of said third resolver, a fifth potentiometer, said fourth resolver being connected to and energized by said fifth potentiometer, the outputs of said fourth resolver being connected to the outputs of said second resolver, a solution resolver connected to and energized by the outputs of said fourth resolver and said second resolver and also to a sixth resolver for modifying the inputs to said solution resolver, said sixth resolver being connected to and energized by said first potentiometer and a sixth potentiometer, said sixth potentiometer being operatively connected to said first shaft, and motive means for driving said solution resolver and said sixth resolver, said motive means being energized by one winding of said solution resolver, the output of the second winding of said solution resolver controlling the position of said first shaft.

4. In an ordnance calculating apparatus, electro-mechanical apparatus including a first shaft adapted to be rotated to a setting according to an estimated range, a first potentiometer operatively connected to said shaft and controlled by the displacement of said first shaft, a second potentiometer producing a voltage depending on the depth of the target, electrical means including third and fourth potentiometers and a pair of electrically connected resolvers, a first one of said resolvers being connected to said third potentiometer, the second of said resolvers being connected to the said fourth potentiometer and to said first resolver, said third potentiometer being energized by the total output of said first and second potentiometers, a third resolver connected to and energized by the outputs of said second resolver, the shaft of said third resolver being positioned according to said outputs of said second resolver, a fourth resolver whose rotor is positioned by said shaft of said third resolver, a fifth potentiometer, said fourth resolver being connected to and energized by said fifth potentiometer, the outputs of said fourth resolver being connected to the outputs of said second resolver, a solution resolver connected to and energized by the outputs of said fourth resolver and said second resolver and also to a sixth resolver for modifying the inputs to said solution resolver, said sixth resolver being connected to and energized by said first potentiometer and a sixth potentiometer, said sixth potentiometer being operatively connected to said first shaft, and motive means for driving said solution resolver and said sixth resolver, said motive means being connected to and energized by one winding of said solution resolver, the output of the second winding of said solution resolver controlling the position of said first shaft, and an elevation computer operatively connected to and controlled by said first shaft.

5. In an ordnance calculating apparatus, eltcro-mechanical apparatus including a first shaft adapted to be rotated to a setting according to an estimated range, a first potentiometer operatively connected to said shaft and controlled by the displacement of said first shaft, a second potentiometer producing a voltage depending on the depth of the target, electrical means including third and fourth potentiometers and a pair of electrically connected resolvers, a first one of said resolvers being connected to said third potentiometer, the second of said resolvers being connected to the said fourth potentiometer and to said first resolver, said third potentiometer being energized by the total output of said first and second potentiometers, a third resolver connected to and energized by the outputs of said second resolver, the shaft of said third resolver being positioned according to said outputs of said second resolver, a fourth resolver whose rotor is connected to and positioned by said shaft of said third resolver, a fourth potentiometer, said second resolver being energized by said fifth potentiometer, the outputs of said fourth resolver being connected to the outputs of said second resolver, a solution resolver connected to and energized by the outputs of said fourth resolver and said second resolver and also to a sixth resolver for modifying the inputs to said solution resolver, said sixth resolver being connected to and energized by said first potentiometer and a sixth potentiometer, said sixth potentiometer being operatively connected to said first shaft, and motive means for driving said solution resolver and said sixth resolver, said motive means being connected to and energized by one winding of said solution resolver, the output of the second winding of said solution resolver controlling the position of said first shaft, and temperature and wind compensating means adapted to modify the output of said second winding of said solution resolver, said compensating means being controlled by said first shaft, and means for calculating elevation in accordance with the position of said first shaft.

References Cited in the file of this patent

UNITED STATES PATENTS

| | | |
|---|---|---|
| 2,658,679 | Holbrook | Nov. 10, 1953 |
| 2,660,371 | Cambell | Nov. 24, 1953 |
| 2,670,134 | Lakatos | Feb. 23, 1954 |
| 2,733,006 | Babcock | Jan. 31, 1956 |